United States Patent [19]
Kojima et al.

[11] Patent Number: 5,279,777
[45] Date of Patent: Jan. 18, 1994

[54] PROCESS FOR THE PRODUCTION OF FRICTION MATERIALS

[75] Inventors: Takashi Kojima; Hitoshi Sakamoto, both of Ibaraki; Nobuo Kamioka; Hiroshi Tokumura, both of Saitama, all of Japan

[73] Assignees: Mitsubishi Gas Chemical Co., Inc., Tokyo; Akebono Research and Development Centre, Ltd., Hanyu, both of Japan

[21] Appl. No.: 967,426

[22] Filed: Oct. 28, 1992

[30] Foreign Application Priority Data

Oct. 29, 1991 [JP] Japan .................. 3-310009

[51] Int. Cl.$^5$ .................. B29C 43/56; C01B 31/02
[52] U.S. Cl. .................. 264/29.5; 264/29.6; 264/29.7; 264/85; 264/325; 264/345; 423/449.1
[58] Field of Search .................. 264/29.5, 29.6, 29.2, 264/29.7, 345, 85, 325; 208/44; 423/449

[56] References Cited

U.S. PATENT DOCUMENTS

| | | | |
|---|---|---|---|
| 3,970,174 | 7/1976 | Kirkhart | 264/29.5 |
| 4,209,500 | 6/1980 | Chwastiak | 264/29.2 |
| 4,339,021 | 7/1982 | Kosuda et al. | 264/29.2 |
| 4,348,490 | 9/1982 | Ogiwara . | |
| 4,415,363 | 11/1983 | Sanftlehen et al. . | |
| 4,457,967 | 7/1984 | Chareire et al. . | |
| 4,476,256 | 10/1984 | Hamermesh . | |
| 4,537,823 | 8/1985 | Tsang et al. | 264/119 |
| 4,883,617 | 11/1989 | Benn et al. | 264/29.7 |
| 4,923,661 | 5/1990 | Russo | 264/119 |

FOREIGN PATENT DOCUMENTS

| | | |
|---|---|---|
| 62-273231 | 11/1987 | Japan . |
| 63-219924 | 11/1988 | Japan . |
| 2-044019 | 2/1990 | Japan . |
| 3-237062 | 10/1991 | Japan . |

*Primary Examiner*—Jeffery Thurlow
*Attorney, Agent, or Firm*—Venable, Baetjer, Howard & Civiletti

[57] ABSTRACT

A process for producing a friction material under low-temperature conditions using, as a reinforcement, one or more fibers selected from a metal fiber, an organic fiber and an inorganic fiber and, as a binder, a compounded pitch that consists of a mesophase pitch and sulfur and/or an aromatic nitro compound. The content of an optically anisotropic phase in the mesophase pitch is at least 80% and the softening point of the mesophase pitch is not higher than 270° C. The friction material produced exhibits consistent friction characteristics over a broad temperature range.

15 Claims, 1 Drawing Sheet

PROCESS FOR THE PRODUCTION OF FRICTION MATERIALS

BACKGROUND OF THE INVENTION

This invention relates to a process for the production of friction materials. More particularly, it relates to a process for producing high-performance friction materials that are markedly improved in friction characteristics, wear resistance, heat resistance and anti-fade quality so that they are particularly suitable for use in brakes and clutches.

Friction materials for use in brakes, clutches, etc. are conventionally produced by binding a friction modifier, a filler and a reinforcement with a thermosetting resin such as a phenolic resin, and molding the blend.

Friction materials, in particular those for use in brakes, are required to exhibit extremely high performance in terms of friction characteristics, wear resistance, heat resistance and anti-fade quality and the greater part of their performance is determined by the performance of the binder resin. With conventional friction materials which use phenolic resins and other thermosetting resins as binders, it is impossible to completely eliminate the problems that result from the deterioration of binders with time and their low heat resistance, i.e. the change in friction characteristics, wear, thermal crack and fade. Under the circumstances, studies have been made of using other thermosetting resins as binders (e.g. furan resins and modified phenolic resins) but, as of today, no friction materials have yet been produced that far excel the prior art versions in performance.

Another class of friction materials that have been the subject of extensive studies are those which use sintered metals or carbon/carbon composites unlike the conventional friction materials which use thermosetting resins as binders. However, sintered metals involve serious problems such as "vapor lock" due to their high heat conductivity and fusion of the friction surface under high load, whereas carbon/carbon composite materials suffer from the problem that they exhibit only instable friction characteristics and low frictional resistance during low-and medium-speed running due to their inherent sliding quality and that they will wear rapidly. Further, the two kinds of friction materials have a common disadvantage in that their production rate is so low that they are very expensive. As a result, friction materials made of sintered metals or carbon/carbon composite materials find very limited use.

With a view to solving these problems of the prior art, the present inventors previously studied a friction material using mesophase pitch as a binder and developed a friction material of very high performance that was capable of exhibiting consistent friction performance even under high-load conditions (Japanese Patent Public Disclosure No. 219924/1988). However, to produce that friction material, hot molding under high-temperature conditions of 400°–650° C. and, hence, an expensive press unit are necessary, which is an obstacle to the implementation of commercial production.

SUMMARY OF THE INVENTION

The present inventors hence conducted intensive studies in order to develop an industrially advantageous process for the production of high-performance friction materials. As a result, they found that when a pitch that had sulfur and/or an aromatic nitro compound contained in mesophase pitch having low softening point was used as a binder, molding could be achieved under low-temperature conditions to yield a friction material of very good performance. The present invention has been accomplished on the basis of this finding.

The present invention provides a process for producing a friction material that uses a binder a compounded pitch that consists of 70–99% of mesophase pitch and 30–1% of sulfur and/or an aromatic nitro compound, the content of an optically anisotropic phase in said mesophase pitch being at least 80% and said mesophase pitch having a softening point of no higher than 270° C.

DETAILED DESCRIPTION OF THE INVENTION

Figure 1:
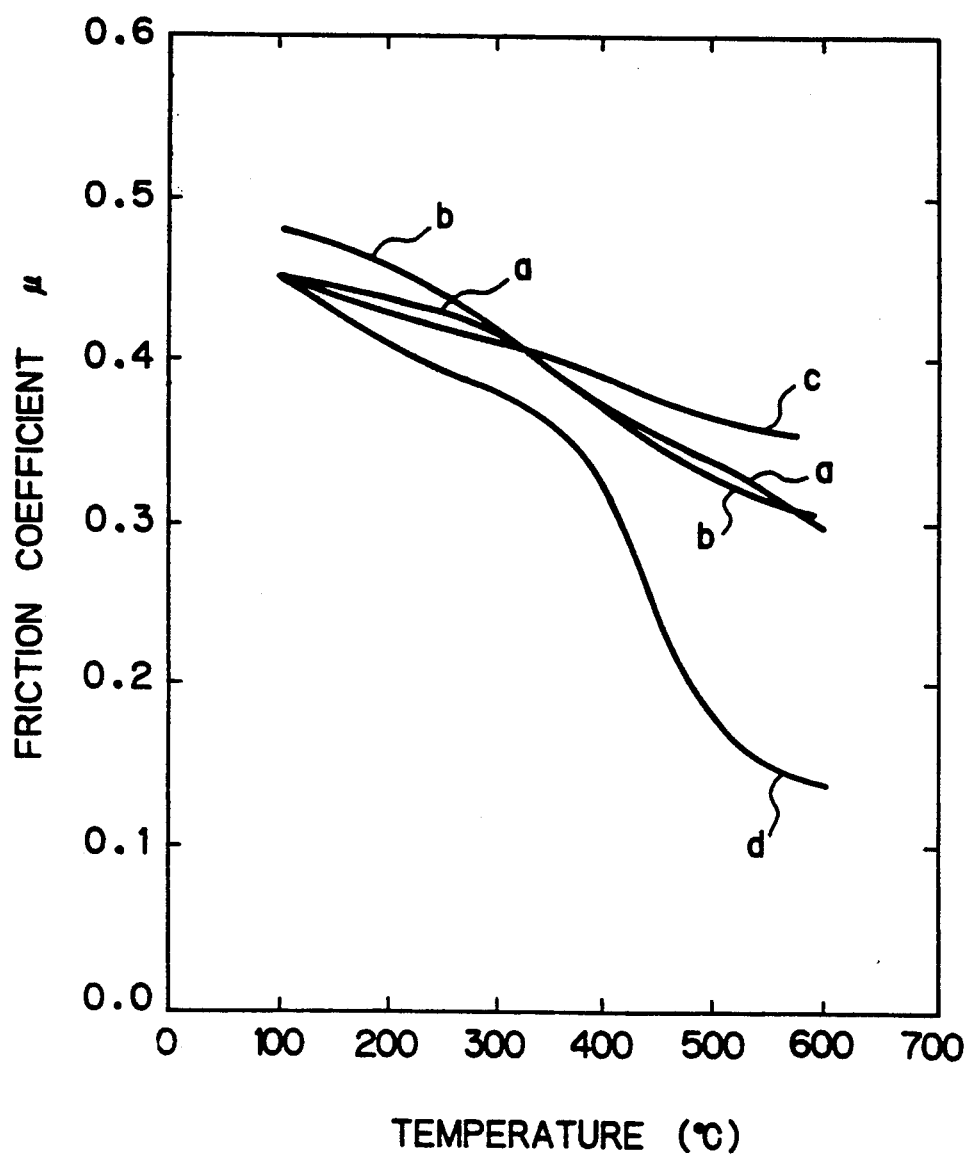
FIG. 1 is a graph showing the results of the brake dynamo test that was conducted in Examples 1 and 2 and in Comparative Examples 1 and 2.

The present invention is described below in detail.

The term "optically anisotropic phase" as used herein means that part of a sample (a pitch mass that was solidified near at ambient temperature and which was polished on a cross-sectional surface) which, when examined with a reflecting optical microscope under crossed Nicols, produces observable brilliance with the sample or the crossed Nicols being rotated (i.e., optically anisotropic). The term "the content of an optically anisotropic phase" means the percent area of that optically anisotropic phase as examined with a microscope. The term "mesophase pitch" means a pitch that contains this optically anisotropic phase. The term "softening point" means the solid-liquid transition temperature as measured on the pitch with a Kohka type flow tester.

The aromatic nitro compound that can be used in the present invention is exemplified by but by no means limited to nitrobenzene, dinitrobenzene, dinitrotoluene, dinitrocresol, nitronaphthalene, dinitronaphthalene, nitroanthracene and dinitroanthracene. Such aromatic nitro compounds may be used either independently or as admixtures; if desired, they may contain isomers. For reasons of commercial availability and easy handling, dinitronaphthalene can be used with advantage.

According to the present invention, a pitch that consists of 70–99% of mesophase pitch and 30–1% of sulfur and/or an aromatic nitro compound is used as a binder for friction materials, the content of an anisotropic phase, as defined above, in said mesophase pitch being at least 80% and said mesophase pitch having a softening point of no higher than 270° C. If the content of sulfur and/or an aromatic nitro compound in the pitch to be used in the present invention is less than 1%, satisfactory impregnation cannot be achieved at low temperature; if their content is more than 30%, they will remain unreacted in the molding. In either case, the resulting friction material has lower strength. This is also true with the case of using mesophase pitch that softens at higher than 270° C.; satisfactory impregnation is not achieved at low temperature and only poor molding will result.

In the process of the present invention, the compounded pitch described above is used as a binder to produce a friction material. The friction material produced contains a reinforcement such as a metal fiber, an organic fiber or an inorganic fiber. Exemplary metal fibers include steel fibers and copper fibers; exemplary organic fibers include aramid fibers and aramid pulp fibers; and exemplary inorganic fibers include glass fibers, $Al_2O_3$-$SiO_2$ fibers, potassium titanate fibers and rock wool.

The reinforcement is preferably used in combination with other additives such as a friction modifier and a filler. The terms "friction modifier" and "filler" designate metallic, inorganic or organic powders and short fibers, as specifically exemplified by a copper powder, an iron powder, a zinc powder, $BaSO_4$, $Sb_2O_3$, $Fe_3O_4$, $ZrSiO_4$ etc. Other powders and short fibers may be used in accordance with a specific object but without any other limitations.

The amount in which the binder is to be used in the present invention is not limited to any particular value but in the case of extreme overdose or underdose, the strength of the friction material produced will decrease. Hence, the binder is preferably used in an amount ranging from 3 to 40%. The ingredients can be mixed by any method, whether wet or dry, that is employed in the production of common friction materials.

To produce friction materials by the process of the present invention, hot compression molding and any other hot molding methods can be employed that are applied to the molding of common friction materials.

The compounded pitch to be used as a binder in the present invention softens at a temperature 5°-80° C. lower than the softening point of the mesophase pitch which is one ingredient of the pitch. In a typical case, the compounded pitch exhibits satisfactory fluidity and impregnation even at low temperatures of 200° C. and below. Having reactivity with this mesophase pitch, sulfur or aromatic nitro compound which is the ingredient to be compounded undergoes vigorous reaction at temperatures exceeding about 180° C. and, after a heat treatment conducted at 240° C. and above, there occurs conversion to a substantially dense carbonaceous material having high heat stability.

In addition, the carbonaceous material resulting from the compounded pitch will experience only limited weight loss while working as a very stable binder in a temperature range from ambient up to about 1000° C.; hence, a friction material can be molded from this carbonaceous material even at low temperatures of about 180°-400° C.

The friction material produced by the process of the present invention is molded at comparatively low temperatures and yet it experiences only limited weight loss while exhibiting high strength in a temperature range of from ambient up to about 1000° C., with the attendant advantage of exhibiting extremely high performance in terms of friction characteristics, wear resistance, heat resistance and anti-fade quality. The friction material thus molded may optionally be subjected to a heat treatment at 1000° C. and below in an inert gas atmosphere such as a nitrogen gas.

The following examples are provided for the purpose of further illustrating the present invention but are in no way to be taken as limiting.

COMPARATIVE EXAMPLE 1

Steel fibers (45 parts), $BaSO_4$ (10 parts), $Sb_2O_3$ (3 parts), $ZrSiO_4$ (10 parts), a graphite powder (30 parts), a Zn powder (2 parts) and a mesophase pitch (9 parts) that had a softening point of 245° C. and whose content of optically anisotropic phase was 100% were dry mixed with a mixer for 5 min. The blend was subjected to preliminary molding, placed in a mold and hot molded at 600° C. to prepare a braking pad.

The friction characteristics of the pad were tested with a brake dynamo meter and the result is shown by curve c in FIG. 1. Upon completion of the test, the pad was found to have undergone a total wear of 0.35 mm. The test result shows that the pad of Comparative Example 1 exhibited extremely high performance in terms of friction characteristics, wear resistance, heat resistance and anti-fade quality; however, hot molding at 600° C. was necessary to produce the pad.

EXAMPLE 1

Steel fibers (45 parts), $BaSO_4$ (10 parts), $Sb_2O_3$ (3 parts), $ZrSiO_4$ (10 parts), a graphite powder (30 parts), a Zn powder (2 parts) and a compounded pitch (9 parts) that consisted of 20% sulfur and 80% of mesophase pitch having a softening point of 203° C. and whose content of optically anisotropic phase was 99% were dry mixed with a mixer for 5 min. The blend was subjected to preliminary molding, placed in a mold and hot molded at 250° C., taken out of the mold and subjected to a heat treatment in a nitrogen atmosphere at 600° C. to prepare a braking pad.

The pad was subjected to a dynamo test as in Comparative Example 1 and the result is shown by curve a in FIG. 1. Upon completion of the test, the pad was found to have undergone a total wear of 0.46 mm. The test result shows that the pad of Example 1 was molded at low temperature but that it exhibited as high performance as the pad of Comparative Example 1 in terms of friction characteristics, wear resistance, heat resistance and anti-fade quality.

EXAMPLE 2

Steel fibers (45 parts), $BaSO_4$ (10 parts), $Sb_2O_3$ (3 parts), $ZrSiO_4$ (10 parts), a graphite powder (30 parts), a Zn powder (2 parts) and a compounded pitch (9 parts) that consisted of 15% of dinitronaphthalene and 85% of mesophase pitch having a softening point of 232° C. and whose content of optically anisotropic phase was 100% were dry mixed with a mixer for 5 min. The blend was placed in a mold, hot molded at 300° C., taken out of the mold and subjected to a heat treatment in a nitrogen atmosphere at 600° C. to prepare a braking pad.

The pad was subjected to a dynamo test as in Comparative Example 1 and the result is shown by curve b in FIG. 1. Upon completion of the test, the pad was found to have undergone a total wear of 0.44 mm. The test result shows that despite molding at low temperature, the pad of Example 2 exhibited as high performance as the pad of Comparative Example 1 in terms of friction characteristics, wear resistance, heat resistance and anti-fade quality.

COMPARATIVE EXAMPLE 2

Steel fibers (45 parts), $BaSO_4$ (10 parts), $Sb_2O_3$ (3 parts), $ZrSiO_4$ (10 parts), a graphite powder (30 parts), a Zn powder (2 parts) and a novolak phenolic resin (9 parts) containing 10% of hexamine were dry mixed with a mixer for 5 min and subjected to preliminary molding. The resulting preform was hot molded in a mold that had been preheated to 150° C. Thereafter, post-curing was conducted at 230° C. to prepare a braking pad.

The pad was subjected to a dynamo test as in Comparative Example 1 and the result is shown by curve d in FIG. 1, from which one can see that the pad of Comparative Example 2 was low in heat resistance and faded considerably (experienced a marked drop in friction coefficient). Upon completion of the test, the pad was found to have undergone a total wear of 0.68 mm, indicating that it was also poor in wear resistance.

In accordance with the process of the present invention, friction materials that exhibit consistent friction characteristics over a broad temperature range can be produced in an economically advantageous way under low-temperature molding conditions.

What is claimed is:

1. In a process for the production by a hot molding technique of a friction material using as a reinforcement one or more fibers selected from the group consisting of a metal fiber, an organic fiber and an inorganic fiber, the improvement wherein a compounded pitch that consists of 70-99% of mesophase pitch and 30-1% of sulfur and/or an aromatic nitro compound is used as a binder, the content of an optically anisotropic phase in said mesophase pitch being at least 80% and said mesophase pitch having a softening point of no higher than 270° C.

2. A process according to claim 1 wherein the aromatic nitro compound is selected from the group consisting of nitrobenzene, dinitrobenzene, dinitrotoluene, dinitrocresol, nitronaphthalene, dinitronaphthalene, nitroanthracene, dinitroanthracene and mixtures thereof.

3. A process according to claim 1 wherein the aromatic nitro compound is dinitronaphthalene.

4. A process according to claim 1 wherein the metal fiber is selected from the group consisting of a steel fiber and a copper fiber.

5. A process according to claim 1 wherein the organic fiber is selected from the group consisting of an aramid fiber and an aramid pulp fiber.

6. A process according to claim 1 wherein the inorganic fiber is selected from the group consisting of a glass fiber, an $Al_2O_3$-$SiO_2$ fiber, a potassium titanate fiber and rock wool.

7. A process according to claim 1 wherein the friction material further contains a friction modifier and a filler.

8. A process according to claim 7 wherein the friction modifier and the filler are each a metallic, inorganic or organic powder or short fiber.

9. A process according to claim 8 wherein the friction modifier and the filler are each selected from the group consisting of a copper powder, an iron powder, a zinc powder, $BaSO_4$, $Sb_2O_3$, $Fe_3O_4$ and $ZrSiO_4$.

10. A process according to claim 1 wherein the binder is used in an amount of 3-40% on the basis of the weight of the friction material.

11. A process according to claim 1 wherein the friction material is produced by hot compression molding.

12. A process according to claim 1 wherein the friction material is produced by hot molding.

13. A process according to claim 12 wherein the molding temperature is in the range of 180°-400° C.

14. A process according to claim 1 wherein the friction material as molded is heat treated in an inert atmosphere at a temperature of 1000° C. and below.

15. A process according to claim 14 wherein the inert atmosphere is a nitrogen atmosphere.

* * * * *